United States Patent [19]

Waters

[11] Patent Number: 4,904,082
[45] Date of Patent: Feb. 27, 1990

[54] FRINGE VISIBILITY ENHANCEMENT ARRANGEMENT AND METHOD

[75] Inventor: James P. Waters, Ellington, Conn.

[73] Assignee: United Technologies Corporation, Hartford, Conn.

[21] Appl. No.: 289,863

[22] Filed: Dec. 27, 1988

[51] Int. Cl.$^4$ ............................................. G01B 9/02
[52] U.S. Cl. ............................................. 356/345
[58] Field of Search ........................................ 356/345

[56] References Cited

U.S. PATENT DOCUMENTS 4,699,513 10/1987 Brooks et al. .................... 356/345

Primary Examiner—Davis L. Willis
Assistant Examiner—Matthew W. Koren
Attorney, Agent, or Firm—Peter R. Ruzek

[57] ABSTRACT

An arrangement for smoothing a coherent laser beam of a limited yet substantial coherence length due to the presence of several discrete optical frequencies therein is operative for subdividing the coherent laser beam into a plurality of partial beams of substantially the same intensity. Each of the partial beams is then conducted in a different path, the length of at least one of which differs from that of another path by a distance amounting to a fraction of the coherence length. At least some of the partial beams are subsequently combined into a coherent output beam in which the partial beam issued from the one path is shifted by the distance relative to that issued from the other path.

20 Claims, 1 Drawing Sheet

4,904,082

FRINGE VISIBILITY ENHANCEMENT ARRANGEMENT AND METHOD

TECHNICAL FIELD

The present invention relates to interferometric detection in general, and more particularly to an arrangement for enhancing the visibility of fringe patterns in interferometric measuring systems which use limited coherence lasers as the interferometric sources.

BACKGROUND ART

There are already known various constructions of interferometric measuring systems, among them, for instance, so-called coherence multiplexed systems such as those constructed to be employed as laser vibration sensors or optical coherence multiplexers. It is usually not possible to use such known techniques such as high frequency laser modulation (greater than 10 MHz) or special coatings on the laser mirrors in coherence multiplexed systems since they typically produce coherence lengths of less than 100 micrometers, which is insufficient for such applications. Therefore, a short coherence length laser diode, with a coherence length in the range of about one to ten centimeters, is often an important component of the interferometric measuring arrangements of the latter type. This limited yet still significant coherence length is typically achieved by constructing the laser diode in such a manner as to simultaneously emit light at several discrete optical frequencies. However, when such a laser diode is used in a laser vibration sensor, in an optical coherence multiplexer or in similar applications, there is encountered the disadvantage that the fringe visibility profile is discontinuous at periodic intervals of the aforementioned 1–10 continuation range as a result of the presence of the aforementioned discrete frequencies in the laser beam. Such discontinuities then result in signal dropout at periodic intervals of path mismatch between the two arms of the interferometer employed in the system of this kind. This, of course, is very disadvantageous because at least some of the information to be gathered, transmitted and/or evaluated is lost.

Accordingly, it is a general object of the present invention to avoid the disadvantages of the prior art.

More particularly, it is an object of the present invention to provide an interferometric measuring arrangement which does not possess the disadvantages of the known arrangements of this kind.

Still another object of the present invention is to develop a smoothing device for use in the arrangement of the type here under consideration, which device enhances the interferometric fringe visibility in the optical output of such an arrangement.

It is yet another object of the present invention to devise a smoothing device of the above type in such a manner as to operate in a purely passive mode after or even without an initial adjustment.

A concomitant object of the present invention is design the device of the above type in such a manner as to be relatively simple in construction, inexpensive to manufacture, easy to use, and yet reliable in operation.

DISCLOSURE OF THE INVENTION

In keeping with these objects and others which will become apparent hereafter, one feature of the present invention resides in an arrangement for smoothing a coherent laser beam of a limited yet substantial coherence length due to the presence of several discrete optical frequencies therein. This smoothing arrangement includes means for subdividing the coherent laser beam into a plurality of partial beams of substantially the same intensity; means for conducting each of the partial beams in a different path, the length of at least one of the paths differing from that of another by a distance amounting to a fraction of the coherence length; and means for combining at least some of the partial beams after passage thereof through the conducting means into a coherent output beam in which the partial beam issued from the one path is shifted by the distance relative to that issued from the other path.

Another feature of the present invention resides in a method of smoothing a coherent laser beam of a limited yet substantial coherence length due to the presence of several discrete optical frequencies therein, this method comprising the steps of subdividing the coherent laser beam into a plurality of partial beams of substantially the same intensity; conducting each of the partial beams in a different path, the length of at least one of the paths differing from that of another by a distance amounting to a fraction of said coherence length; and subsequently combining at least some of the partial beams with one another to form a coherent output beam in which the partial beam issued from the one path is shifted by said distance relative to that issued from the other path.

BRIEF DESCRIPTION OF THE DRAWING

The present invention will be described in more detail below with reference to the accompanying drawing in which.

BEST MODE FOR CARRYING OUT THE INVENTION

Figure 1:
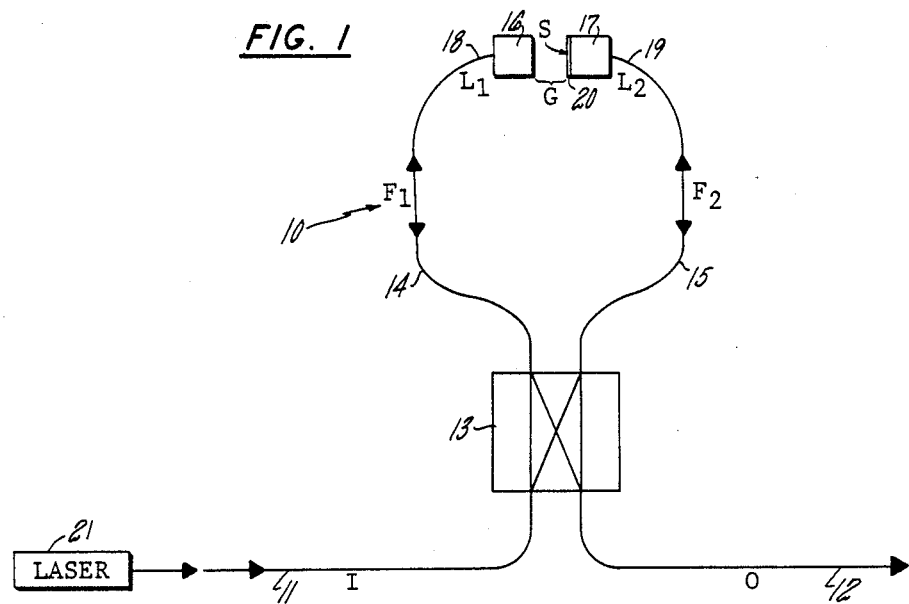
FIG. 1 is a diagrammatic view of a smoothing arrangement of the present invention.

Referring now to the drawing in detail, and first to FIG. 1 thereof, it may be seen that the reference numeral 10 has been used therein to identify a smoothing arrangement of the present invention. The arrangement 10 is shown to be interposed between an input optical fiber section 11 (or I) and an output optical fiber section 12 (or 0).

The optical fiber sections 11 and 12 lead to a beam splitting and combining device 13 of the arrangement 10, which is shown to be constituted by a two-by-two optical coupler. Further components of the arrangement 10 are two shared optical fiber sections 4 (or $F_1$) and 15 (or $F_2$) which lead from the device 13 along separate paths to respective associated lenses 16 (or $L_1$) and 17 (or $L_2$) of the arrangement 10. The lenses 16 and 17 may be conventional or graded index lenses and they are operative for collimating the light emerging from the associated ones of mutually aligned and facing end faces of respective end portions 18 and 19 of the shared optical fiber sections 14 and 15. The thus collimated light traverses a gap G which separates the lenses 16 and 17 from one another.

A further important component of the arrangement 10 is a partially reflecting and partially transmissive mirror 20 (or S) which is shown to be situated at that major surface of the lens 17 which faces the gap G. While it is currently preferred to for the mirror 20 to be constituted by a coating on the one major surface of one lens, such as 17, it will be appreciated that such mirror 20 could be a component separate from either one of the lenses 16 and 17 and situated in the gap G either next to one of the lenses 16 and 17 or at a spacing therefrom. In any event, however, for reasons that will be explained below, the mirror 20 is spaced more, by a predetermined distance (which may correspond to the size of the gap G), from one of the lenses (such as 17) than from the other one (such as 16), and either the position of the mirror 20 in the gap G, or the size of the gap G, or both, may be adjustable.

In operation, coherent laser light beam exhibiting a limited yet considerable coherence length, for instance, due to its generation in a laser 21 which is constructed as a laser diode that operates at a plurality of discrete frequencies, is launched into the input fiber section 11, passes through the coupler 13 where it is separated into two beam portions that enter the shared fiber sections 14 and 15. Thereafter, partial beams resulting from either passage of a part of the respective beam portion through, or reflection of the remainder of the respective beam portion from, the mirror 20 propagate, after or without traversing the gap G, through the respective shared optical fiber sections 14 and 15 back to the coupler 13 and from there partially into the input fiber section 11 and partially into the output fiber section 12. Thus, it may be seen that the optical fiber sections 14 and 15 are shared by such partial beams either while they are still parts of the respective beam portions, or while they are separately returning to the coupler 13 after having been either reflected by or transmitted through the mirror 20.

As a result of the above-described construction of the arrangement 10, the limited coherence laser light entering the coupler 13 from the input fiber section 11 travels through the arrangement 10, as either the beam portions or the partial beams, in eight distinct paths, four of which lead into the output fiber section 12 so that the light travelling in such paths is forwarded into the section 12, and the remaining four of which lead back into the input fiber section 11 so that the light travelling in such remaining paths is returned into the section 11. This situation will now be symbolically represented, using the identifying characters parenthetically mentioned before, as follows:

Forwarded:
(1) $I \to F_1 \to L_1 \to G \to S \to L_2 \to F_2 \to 0$
(2) $I \to F_2 \to L_2 \to S \to G \to L_1 \to F_1 \to 0$
(3) $I \to F_1 \to L_1 \to G \to S \to G \to L_1 \to F_1 \to 0$
(4) $I \to F_2 \to L_2 \to S \to L_2 \to F_2 \to 0$ Returned:
(5) $I \to F_1 \to L_1 \to G \to S \to L_2 \to F_2 \to I$
(6) $I \to F_2 \to L_2 \to S \to G \to L_1 \to F_1 \to I$
(7) $I \to F_1 \to L_1 \to G \to S \to G \to L_1 \to F_1 \to I$
(8) $I \to F_2 \to L_2 \to S \to L_2 \to F_2 \to I$ When the length of the shared optical sections 14 and 15 is selected to be equal, when the coupling ratio of the coupler 13 is 50%, and when the mirror 20 is made about 66% reflective in the above-described construction of the arrangement 10, then the lengths of the paths (1) and (2) will differ from the length of the path (4) by a distance equal to the width of the gap G and each will conduct a respective partial beam of an intensity equal to a half of the intensity of each of the partial beams propagating in the paths (3) and (4). Furthermore, the length of the path (3) differs from the length of the path (4) by twice the distance corresponding to the width of the gap G. The net result of this is that there are obtained three forwarded partial beams (two of which result from combination of the partial beams emerging from the paths (1) and (2) in the coupler 13) of equal intensity and differing in path lengths by once and twice the width of the gap G (or, more generally, by once and twice the distance by which the mirror 20 is spaced more from one of the lenses or end faces than from the corresponding other one).

Figure 2:
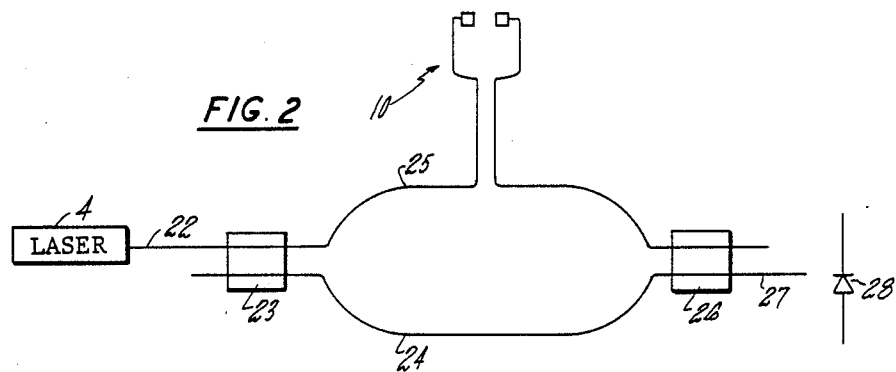
FIG. 2 is a view of an interferometer incorporating the smoothing arrangement of FIG. 1.

The total intensity of the forwarded output coherent light beam propagating in the output section 12 will amount to a half of the intensity of the original laser beam, with the remaining half being reflected back into the input fiber section 11 for travel back toward the laser 21. Thus, the arrangement 10 reduces the forwarded power by 3 dB, but this reduction can usually be tolerated, especially when using heterodyne detections systems for evaluation of the light emerging from the output fiber section 12, or an interference pattern obtained from using the arrangement 10 in an interferometric system depicted in FIG. 2 of the drawing.

As shown there, the limited coherence laser light issued by the laser 21 is launched into a guiding optical fiber 22 which leads to an additional optical coupler 23 which splits this laser light into two substantially identical laser beams one of which is directed into an optical fiber 24 constituting one arm, while the other is directed into an optical fiber 25 constituting the other arm, of a Mach-Zehnder interferometer. The smoothing device 10, the construction of which has been discussed above, is interposed in the optical fiber 25. The optical fibers 24 and 25 lead to a further coupler 26 from where an output fiber 27 leads toward a detector 28. The aforementioned interferometer utilizes, in addition to the reference beam propagating in the fiber 25, a probe beam, so that an interference pattern exhibiting fringes and obtained from the interference of such probe and reference beams in the interferometer; however, the way in which this probe beam is produced and employed is conventional and thus need not be discussed here because such discussion is not necessary for understanding the present invention.

Figure 3:
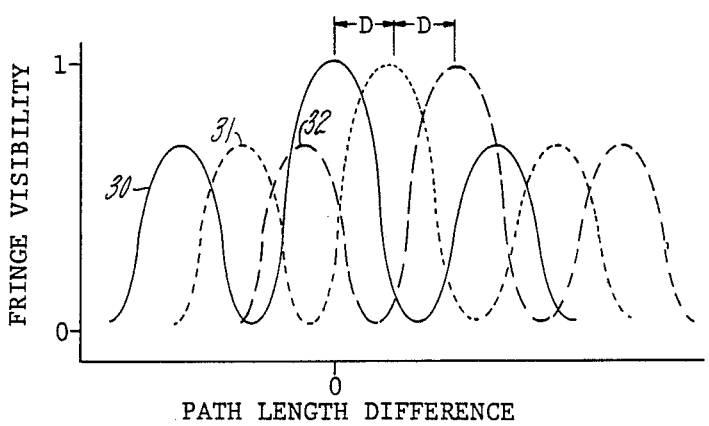
FIG. 3 is a graphic representation of the relationship of various fringe visibility profiles obtained in the interferometer of FIG. 2.

What is important to realize, however, is that the characteristic coherence function of the laser 21 is triplicated by placing the above-discussed smoothing arrangement 10 in one arm (such as 25) of an interferometer, causing the fringe visibility profiles to overlap by an amount equal to once and twice the width of the gap G. This is graphically presented in FIG. 3 of the drawing, where the reference numerals 30, 31 and 32 indicate the fringe visibility for the partial beam (4) (curve 30), for the combination of the partial beams (1) and (2) (curve 31), and for the partial beam (3) (curve 32), respectively. It may be seen there that, while each individual curve, such as 30, has regions at and around which the fringe visibility is zero or too low for reliable detection or discrimination, the regions of the other two curves, such as 31 and 32, which coincide in time with such signal dropout regions of the first-mentioned curve, such as 30, exhibit either higher or very high degree of fringe visibility. As a consequence, the net result is a fringe visibility profile substantially smoother than that obtained when the smoothing arrangement 10 is absent from one arm (such as 25) of the interferometer, and thus the elimination of signal dropout at periodic intervals of path mismatch between the two arms 24 and 25 of the interferometer.

The present invention is particularly useful when the laser 21 is a commercially available, limited coherence length laser, such as multifrequency laser diode, employed in coherence multiplexed systems; however, it will be appreciated that the approach presented here may also be employed in other applications.

The arrangement 10 is completely passive, that is, it does not require any additional electronic circuitry or other feedback-type arrangements for its operation. Moreover, the arrangement 10 can be easily tuned to each individual laser 21 simply by varying the size of the gap G (and/or by changing the position of the mirror 20 in the gap G if the mirror 20 is separate from each of the lenses 17 and 18), which alters the degree of overlap while keeping the amplitude of the three overlapping profiles equal. Inasmuch as the smoothing arrangement 10 is interposed in only one of the arms of the interferometer, the total loss in the transmitted laser beam power will amount to only 1.5 dB which, as mentioned above, can be easily tolerated in heterodyne detection systems. Obviously, the size of the gap G is only a small fraction of the coherence length, and even the difference between the path lengths through the arm 25 (inclusive of the arrangement 10) and the arm 24 is smaller than the coherence length.

While the present invention has been illustrated and described as embodied in a particular construction of a fringe visibility smoothing arrangement, it will be appreciated that the present invention is not limited to this particular example; rather, the scope of protection of the present invention is to be determined solely from the attached claims.

I claim:

1. An arrangement for smoothing a coherent laser beam of a limited yet substantial coherence length due to the presence of several discrete optical frequencies therein, comprising
    means for subdividing the coherent laser beam into a plurality of partial beams of substantially the same intensity;
    means for conducting each of said partial beams in a different path, the length of at least one of said paths differing from that of another by a distance amounting to a fraction of said coherence length; and
    means for combining at least some of said partial beams after passage thereof through said conducting means into a coherent output beam in which the partial beam issued from said one path is shifted by said distance relative to that issued from said other path.

2. The arrangement as defined in claim 1, and further comprising means for guiding said coherent laser beam toward said subdividing means and said coherent output beam away from said combining means.

3. The arrangement as defined in claim 2, wherein said guiding means includes an input optical fiber section and an output optical fiber section; wherein said conducting means includes a shared optical loop including two shared optical fiber sections each having two end faces one of which alignedly faces that of the respective other shared optical fiber section and is spaced therefrom by a gap, and a mirror partially reflective and partially transmissive to said partial beams and situated in said gap closer by said distance to one than to the other of said end faces; and wherein said subdividing and combining means is interposed between the other end faces of said two shared optical fiber sections, on the one hand, and said input and output optical fiber sections, on the other hand.

4. The arrangement as defined in claim 3, wherein said subdividing and combining means are constituted by an optical splitter/combiner element.

5. The arrangement as defined in claim 4, wherein said optical splitter/combiner element is a two-by-two optical coupler.

6. The arrangement as defined in claim 3, wherein said conducting means further includes two lenses each arranged in said gap at a different one of said end faces and operative for collimating said partial laser beams emerging from the associated one end face.

7. The arrangement as defined in claim 6, wherein each of said lenses is a graded index lens.

8. The arrangement as defined in claim 6, wherein said mirror is situated at one of said lenses.

9. The arrangement as defined in claim 2, wherein said conducting means includes a shared optical loop including two shared optical fiber sections each having two end faces one of which alignedly faces that of the respective other shared optical fiber section and is spaced therefrom by a gap, and a mirror partially reflective and partially transmissive to said partial beams and situated closer by said distance to one than to the other of said end faces; and wherein said subdividing and combining means is interposed between said other end faces of said two shared optical fiber sections, on the one hand, and said guiding means, on the other hand.

10. The arrangement as defined in claim 9, wherein said conducting means further includes two lenses each arranged in said gap at a different one of said end faces and operative for collimating said partial laser beams emerging from the associated one end face.

11. The arrangement as defined in claim 10, wherein each of said lenses is a graded index lens.

12. The arrangement as defined in claim 10, wherein said mirror is situated at one of said lenses.

13. An interferometric arrangement comprising
    means for forming a coherent laser beam of a limited yet substantial coherence length due to the presence of several discrete optical frequencies therein; comprising
    means for splitting the coherent laser beam into two substantially equal laser beam portions;
    means for guiding each of said laser beam portions in a different trajectory;
    means for joining said laser beam portions downstream of said guiding means for interference with one another; and
    means for enhancing the interference fringe visibility, including
        means for subdividing one of said laser beam portions propagating in one of said guiding means into a plurality of partial beams of substantially the same intensity,
        means for conducting each of said partial beams in a different path, the length of at least one of said paths differing from that of another by a distance amounting to a fraction of said coherence length, and
        means for combining at least some of said partial beams after passage thereof through said conducting means into a coherent output beam in which the partial beam issued from said one path is shifted by said distance relative to that issued from said other path.

14. The arrangement as defined in claim 13, wherein said conducting means includes a shared optical loop including two shared optical fiber sections each having two end faces one of which alignedly faces that of the respective other shared optical fiber section and is spaced therefrom by a gap, and a mirror partially reflective and partially transmissive to said partial beams and situated closer by said distance to one than to the other of said end faces; and wherein said subdividing and combining means is interposed between said other end faces of said two shared optical fiber sections, on the one hand, and said guiding means, on the other hand.

15. The arrangement as defined in claim 14, wherein said conducting means further includes two lenses each arranged in said gap at a different one of said end faces and operative for collimating said partial laser beams emerging from the associated one end face.

16. The arrangement as defined in claim 15, wherein each of said lenses is a graded index lens.

17. The arrangement as defined in claim 15, wherein said mirror is situated at one of said lenses.

18. The arrangement as defined in claim 14, wherein said subdividing and combining means are constituted by an optical splitter/combiner element.

19. The arrangement as defined in claim 18, wherein said optical splitter/combiner element is a two-by-two optical coupler.

20. A method of smoothing a coherent laser beam of a limited yet substantial coherence length due to the presence of several discrete optical frequencies therein, comprising subdividing the coherent laser beam into a plurality of partial beams of substantially the same intensity;

conducting each of the partial beams in a different path, the length of at least one of the paths differing from that of another by a distance amounting to a fraction of said coherence length; and subsequently combining at least some of the partial beams with one another to form a coherent output beam in which the partial beam issued from said one path is shifted by said distance relative to that issued from said other path.

* * * * *